March 16, 1965   W. H. GOODING   3,173,459
DISCHARGE CHUTE
Original Filed May 29, 1959

INVENTOR.
WILLARD H. GOODING
BY
EDWARD D. O'BRIAN
ATTORNEY

United States Patent Office 3,173,459
Patented Mar. 16, 1965

3,173,459
DISCHARGE CHUTE
Willard H. Gooding, Los Angeles, Calif., assignor to Western Velo & Cement Specialties Company, Los Angeles, Calif., a corporation of California
Original application May 29, 1959, Ser. No. 816,921, now Patent No. 3,085,674, dated Apr. 16, 1963. Divided and this application Feb. 13, 1963, Ser. No. 258,214
1 Claim. (Cl. 141—285)

This invention pertains to new and improved unloading structures which are primarily intended to be used with granular materials such as cement, said and the like.

The cost of transporting such materials from one location to another is a very important commercial factor at the present time. In general it is preferred to ship materials such as sand, cement and the like from one location to another by railroad because of economic considerations. However, several factors effectively limit the use of railroad transportation in the bulk movement of granular materials.

One of the factors is the availability of railroad transportation including cars appropriate to the material being transported and track unloading facilities. This invention relates to a particular feature of an unloading facility for rail vehicles. While its general utility is not limited to railroad type transportation, the particular installation is particularly designed for such use. It is adaptable also to certain types of over the highway transportation where the truck body is particularly designed for bulk transportation. Rail transportation in the past, however, has been more economic than truck haulage. Accordingly, it has been desirable to ship by rail for the main part of the distance and transfer to a bulk truck at a point convenient to the use of the cement, or other commodity.

Transfer points from rail to truck haulage have been low in number because of the usual high cost of such facilities. The ultimate cost of cement to consumer is indirectly increased because of the fact that bulk transfer points have been required to be located at greater distances because of such cost. Such locations have also been influenced by zoning because these structures often emit a significant amount of cement dust.

Accordingly it is an object of this invention to provide new unloading structures.

It is a particular object of this invention to provide a discharge chute for such unloading structures. Such a discharge chute is desirably economic of operation and accordingly does not loose a significant amount of cement into dust in the air, and is convenient to load the receptacle for which the commodity is intended.

Figure 1:
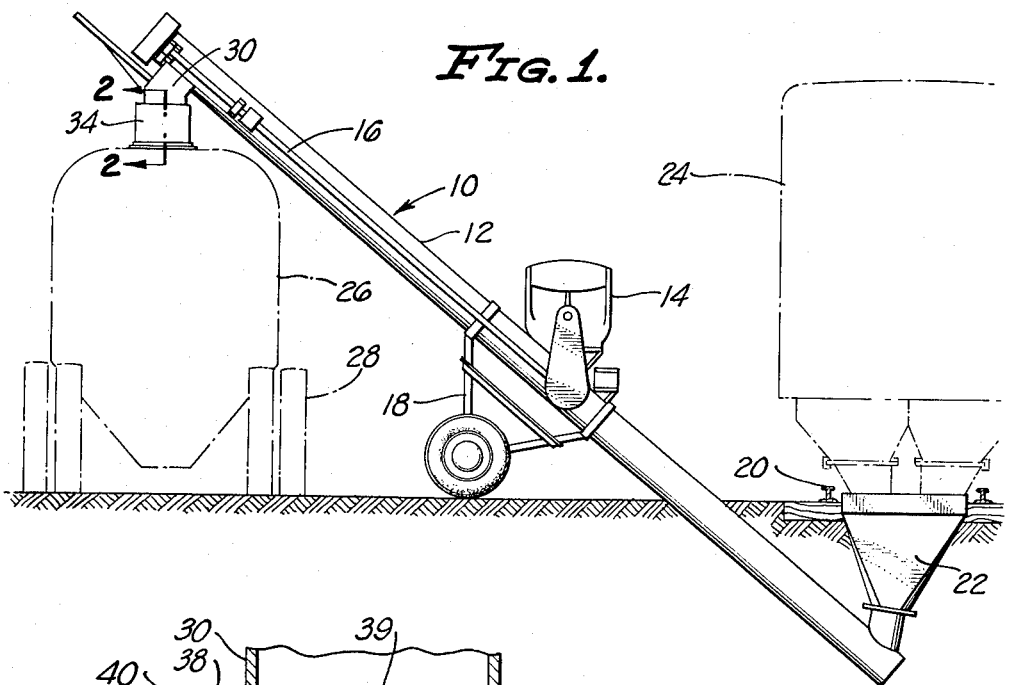
Figure 2:
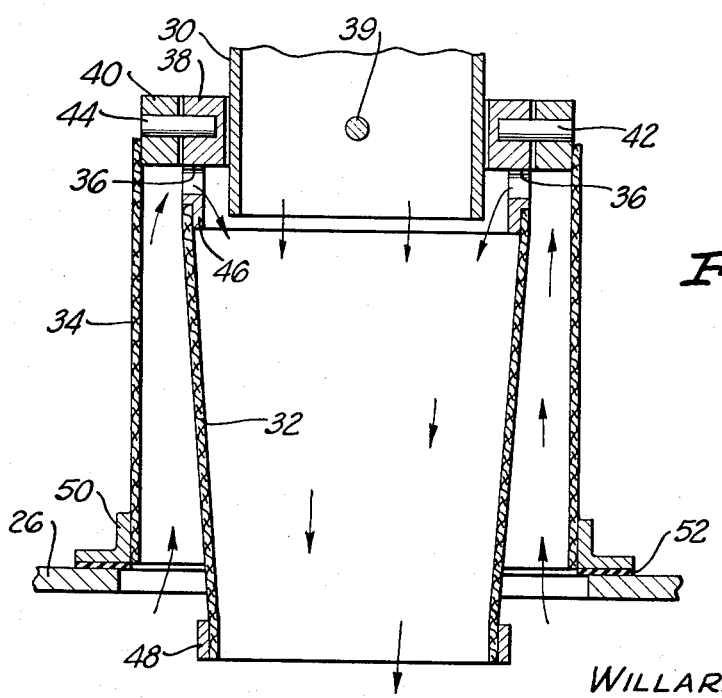

Other objects and advantages of this invention will become fully apparent to those skilled in the art by reference to the following specification and drawings in which:

FIG. 1 is a side elevational view of an unloader carrying the discharge chute of this invention; and FIG. 2 is a cross-sectional view taken along the section 2—2 of FIG. 1 showing the particular details of the discharge chute.

Referring now to the drawings, FIG. 1 shows a conveyor, preferably screw type, identified by numeral 10. The conveyor comprises a housing 12 within which a suitable conveyor screw rotates. Rotational power is provided by a prime mover 14 which may be a conventional internal combustion engine or electric motor. The prime mover turns the screw through suitable power transmitting means such as shaft 16.

Conveyor 10 is provided with suitable support for itself while in use and for transportation by means of a wheel mounting structure 18. The lower end of the conveyor is inserted below railroad tracks 20 by means of a pit structure disclosed in another application. A hopper 22 is mounted below the railroad tracks 20 to provide ingress for material into the screw conveyor 10. By means of this structure a conventional closed railroad car 24 can discharge between rails 20 into the hopper 22 to furnish bulk material to the conveyor 10. While this invention is primarily directed to a conveyor means for moving cement, and is particularly designed for such purpose, it can be used for other finely divided materials as well. Cement is cited in the specification because several features of this invention are particularly adapted for cement transfer.

The receptacle for receiving material discharged by conveyor 10 is shown as a conventional closed body highway truck having body 26 mounted on wheels 28. The upper end of conveyor housing 12 terminates in an outlet conduit 30. The material flowing out of outlet conduit 30 falls through chute 32. Normally considerable dust is created as such material as cement and other finely divided materials are deposited within a bin. This invention is directed to a discharge chute structure which reduces this dust and prevents it from becoming mixed with the atmosphere. An outer housing 34 is provided around the chute 32. The outer housing communicates both with the interior of the truck body 26 as is indicated in FIG. 2 and with the interior of chute 32 through apertures 36. Accordingly when material falls down through outlet conduit 30 into chute 32 it draws with it dust laden air from the interior of truck body 26 through the annulus between chute 32 and housing 34. Thence the dust laden air goes through apertures 36 and mixes with the downward flowing material. This causes the dust to partially settle out of the air and prevents direct communication of the dust laden air from the outside atmosphere.

In structure, the discharge chute includes a ring 38 pivotally mounted on the outlet conduit 30 by means of pin 39. Supported on this ring 38 is a second ring 40 pivotally supported on ring 38 by means of pins 42 and 44. Depending from ring 38 and either integral therewith or secured thereto is a third ring 46. Ring 46 contains the apertures 36. Ring 46 also carries the chute 32 which is preferably made of flexible material such as waterproof canvas. The chute 32 is suitably secured to the third ring 46 and to annular weight 48. Annular weight 48 pulls the chute material downwardly to keep it vertical and in tension at all times.

The outer housing 34 is secured to second ring 40 at its upper end, and at its lower end carries a flanged ring 50. The outer housing 34 is of flexible waterproof material, again such as waterproof canvas and is sealingly secured to both the second ring 40 and to flange ring 50 to prevent escape of dust. The lower side of flange ring 50 is preferably contoured to fit the external configuration of the truck body 26 and the ring 50 carries on its lower side an elastomeric seal 52 such as rubber, designed to form as best a seal as possible.

The discharge chute structure is designed so that chute 32 extends into the aperture in the truck body while the annular flanged ring 50 rests upon the external surface of the truck body 26. The universal flexibility of second ring 40 permits a good seal to be obtained. During the filling of the truck the air originally within the empty truck body 26 will be displaced by the cement that is being filled therein. This air must escape and it does so through the aperture between outlet conduit 30 and ring 38, between ring 38 and ring 40 and between the truck body 26 and the seal member 52. However, such escape of air and dust is very slight compared to the amount of dust that would enter the atmosphere through a conventional open filling operation. Furthermore, these openings are out of the direct line of material filling and accordingly the air adjacent thereto carries considerably less dust. Also these relatively narrow openings have some filtering action for the air velocities adjacent thereto are relatively low and the heavy cement dust attempts to settle out.

The result of preventing loss of dust is exceedingly important in most areas. In urban areas this invention permits successful operation without interference with adjacent property owners. Furthermore, conserving the dust results in a higher efficiency transfer so that more useable cement is transferred then than in prior methods.

This application is a division of my Patent No. 3,085,674 granted April 16, 1963. This reference to the parent patent incorporates its entire disclosure herein by this reference.

Because of the breadth of utility of this invention, it is to be considered as being limited only by the appended claim, which forms a part of this disclosure.

What I claim is:

A discharge structure for conveying granular material into an opening in a container for such material, such discharge structure including:
 an outlet conduit for conveying material, said outlet conduit having a discharge end;
 a ring secured to said outlet conduit adjacent said end, said ring having apertures therethrough adjacent said end, said apertures opening to the outside of said outlet conduit adjacent said end;
 a chute secured to said ring so that said apertures are open from the interior of said chute to the exterior thereof;
 an outer housing secured to said ring exterior to said chute so as to define a space therebetween in communication with said apertures, said outer housing being adapted for sealing engagement around an inlet into a container to which material is adapted to be discharged from said conduit, said chute being longer than said housing so as to be adapted to extend into the opening in the container beyond said seal means on said housing;
 said discharge structure being arranged so that when dust making material is discharged out of said outlet conduit into said chute, dust laden air is inducted through said space between said chute and said housing and through said apertures, the induction being caused by the material discharging from the end of the outlet conduit so that dust in the container is drawn out of the container and is discharged back into the inlet stream of material.

References Cited in the file of this patent

UNITED STATES PATENTS

| | | |
|---|---|---|
| 1,878,874 | McBride | Sept. 20, 1932 |
| 2,105,589 | Eades | Jan. 18, 1938 |
| 2,222,083 | Lintz | Nov. 19, 1940 |
| 2,733,848 | Bos Houwers | Feb. 7, 1956 |